(12) United States Patent
Patro et al.

(10) Patent No.: US 9,698,620 B2
(45) Date of Patent: Jul. 4, 2017

(54) SYSTEM AND A METHOD FOR CHARGING MULTIPLE POWER RECEIVERS IN A WIRELESS CHARGING ENVIRONMENT

(71) Applicant: Samsung Electronics Co., Ltd., Suwon-si, Gyeonggi-do (KR)

(72) Inventors: Ranjeet Kumar Patro, Bangalore (IN); Thenmozhi Arunan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 14/351,421

(22) PCT Filed: Oct. 15, 2012

(86) PCT No.: PCT/KR2012/008405
§ 371 (c)(1),
(2) Date: Apr. 11, 2014

(87) PCT Pub. No.: WO2013/055192
PCT Pub. Date: Apr. 18, 2013

(65) Prior Publication Data
US 2014/0285145 A1    Sep. 25, 2014

(30) Foreign Application Priority Data
Oct. 14, 2011   (IN) .......................... 3545/CHE/2011

(51) Int. Cl.
*H02J 7/00* (2006.01)
*H02J 7/02* (2016.01)
(Continued)

(52) U.S. Cl.
CPC .............. *H02J 7/025* (2013.01); *H02J 17/00* (2013.01); *H04B 5/0031* (2013.01); *H04B 5/0037* (2013.01); *H02J 2007/0001* (2013.01)

(58) Field of Classification Search
USPC ........................................................ 320/108
See application file for complete search history.

(56) References Cited

U.S. PATENT DOCUMENTS

| | | | |
|---|---|---|---|
| 2010/0248622 A1* | 9/2010 | Lyell Kirby | ......... H04B 5/0031 455/41.1 |
| 2011/0115432 A1* | 5/2011 | El-Maleh | ........... G06Q 30/0267 320/108 |

(Continued)

FOREIGN PATENT DOCUMENTS

| | | |
|---|---|---|
| KR | 10-2004-0039043 A | 5/2004 |
| KR | 10-0971705 B1 | 7/2010 |
| KR | 10-2011-0110987 A | 10/2011 |

*Primary Examiner* — Bryce Aisaka
(74) *Attorney, Agent, or Firm* — Jefferson IP Law, LLP

(57) ABSTRACT

A wireless power charging system and a method thereof are provided. The system includes a power transmitter configured to charge one or more power receivers. The power transmitter includes a signal and control unit configured to detect the one or more power receivers present within a radio frequency range of a power transmitter, transmit a request for discovering each of the one or more power receivers, and determine whether a response is received from each of the one or more power receivers. The power transmitter further includes a regulator unit connected to the signal and control unit configured to modulate an amount of radiation to be transmitted based on the number of power receivers that provided a response and a power conversion unit connected to the regulator unit transmitting energy radiation to charge the one or more power receivers.

10 Claims, 13 Drawing Sheets

(51) Int. Cl.
*H02J 17/00* (2006.01)
*H04B 5/00* (2006.01)

(56) References Cited

U.S. PATENT DOCUMENTS

2011/0184888 A1    7/2011  Lee et al.
2011/0258311 A1*  10/2011  Saitou ................ H04L 43/0817
                                                                709/224

* cited by examiner

SYSTEM AND A METHOD FOR CHARGING MULTIPLE POWER RECEIVERS IN A WIRELESS CHARGING ENVIRONMENT

CROSS-REFERENCE TO RELATED APPLICATION(S)

This application is a U.S. National Stage application under 35 U.S.C. §371 of an International application filed on Oct. 15, 2012 and assigned application number PCT/KR2012/008405, which claimed the benefit of an Indian patent application filed on Oct. 14, 2011 in the Indian Intellectual Property Office and assigned Serial number 3545/CHE/2011, the entire disclosure of which is hereby incorporated by reference.

TECHNICAL FIELD

The present disclosure relates to wireless power charging systems. More particularly, the present disclosure relates to a method and a system for discovering multiple devices requiring wireless power.

BACKGROUND

Charging electronic equipment through the air (i.e., by a wireless means) is known in the art. Typically, wireless charging systems include a power transmitter and a power receiver. For example, the power transmission may occur based on inductive coupling established between the transmitter and the receiver. In the related art, there are several methods that have evolved in wireless power charging.

One method of wireless power charging is by establishing a resonance inductive coupling between the power transmitter and the power receiver. In a system using resonance inductive coupling, the electromagnetic field in a primary coil of the power transmitter resonates or oscillates at a frequency which creates a change in the field electricity of the power receiver, thereby causing a flow of current in a secondary coil.

However, the power transmitters may be at times perceived as being disregardful of the power receivers. In other words, regardless of any information of power receivers, the power transmitters can produce constant resonant frequency of the electromagnetic field. This may be an inefficient mode of transferring electric energy through the wireless means because a constant magnitude of electricity is transferred even when foreign power receivers are charged. Here, foreign power receivers may refer to unsolicited electronic or electric devices that conduct electromagnetic field within a boundary of the power transmitter. Accordingly, there exists a need for an improved apparatus and method for discovering multiple devices requiring wireless power charging system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a system for discovering multiple devices requiring wireless power charging system.

In accordance with an aspect of the present disclosure, a method of charging one or more power receivers in a wireless charging environment is provided. The method includes detecting the one or more power receivers present within a radio frequency range of a power transmitter, broadcasting a request for discovering each of the one or more power receivers, receiving a response for the request from the each of the one or more power receivers, transmitting a unicast confirmation to the one or more power receivers on receiving the response, and transmitting radiation to charge at least one of the one or more power receivers on receiving an acknowledgement from the one or more power receivers in response to the unicast confirmation.

In accordance with another aspect of the present disclosure, a wireless power charging system is provided. The wireless power charging system includes a power transmitter configured to charge one or more power receivers. The power transmitter includes a signal and control unit configured to detect the one or more power receivers present within a radio frequency range of a power transmitter, transmit a request for discovering each of the one or more power receivers, and determine whether a response is received from each of the one or more power receivers within a threshold response time. The wireless power charging system further includes a regulator unit connected to the signal and control unit to regulate an amount of radiation to be transmitted based on the number of power receivers that provided a response and a power conversion unit connected to the regulator unit to transmit energy to charge the one or more power receivers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
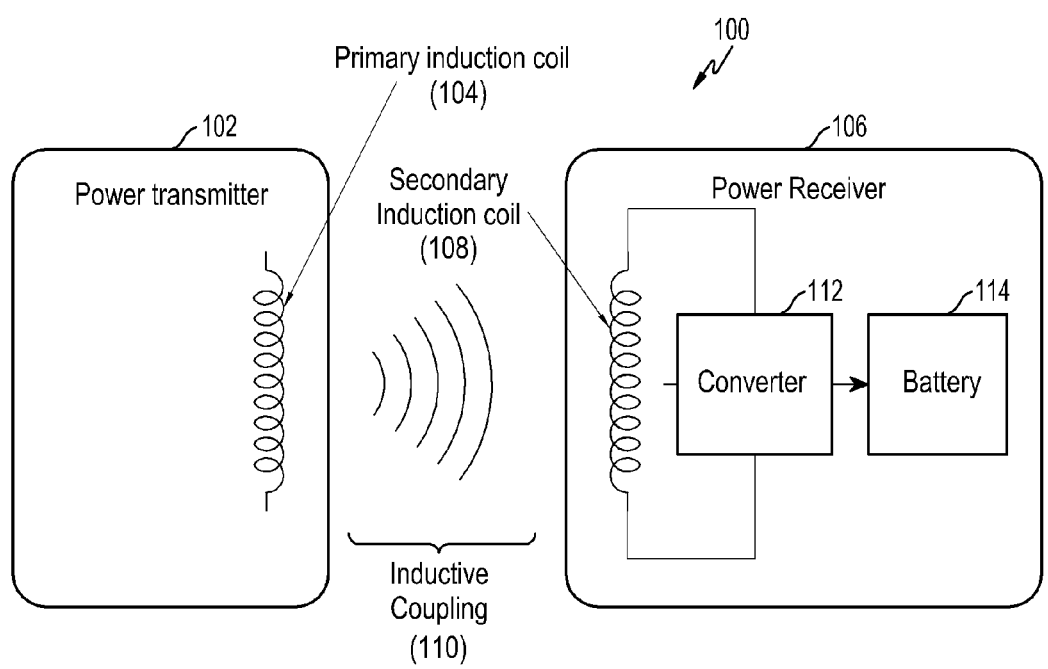
FIG. 1 illustrates an inductive coupling based wireless power charging environment according to the related art.

FIG. 1 illustrates an inductive coupling based wireless power charging environment according to the related art.

Referring to FIG. 1, the inductive coupling based power charging environment 100 of the related art includes a power transmitter 102 and a power receiver 106. The power transmitter 102 is configured to transfer energy by establishing inductive coupling 110 with the power receiver 106. A primary induction coil 104 of the power transmitter 102 is inductively coupled to a secondary induction coil 108 of the power receiver 106. A change of electromagnetic induction in the primary induction coil 104 results in a change of induction in the secondary induction coil 108. The induction occurs due to a transfer of radiation from the primary coil 104 to secondary coil 108. Thereafter, the induction change is converted (by a converter 112) into a proportional Direct Current (DC). The resulting charge (Q) due to the flow of current is stored in a battery 114 that is present in the power receiver 106 for usage. Further details of electromagnetic induction and electric energy transfer through such a method will not be discussed as it is known to the person skilled in the art.

Figure 2:
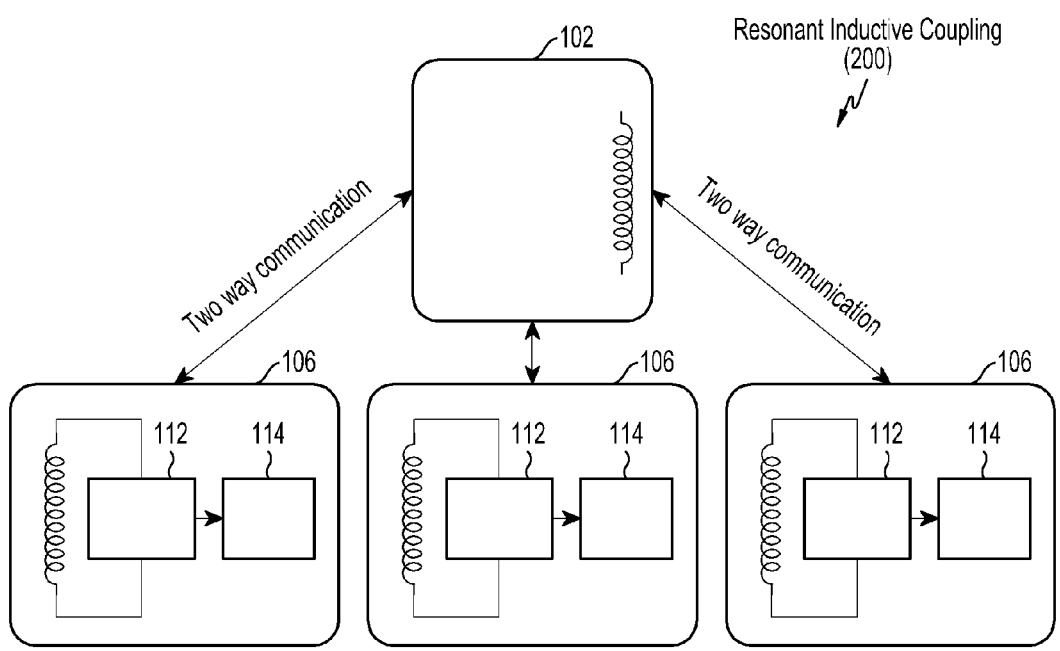
FIG. 2 illustrates a resonant inductive coupling between a power transmitter and one or more power receivers for wireless power charging according to the related art.

FIG. 2 illustrates a resonant inductive coupling between a power transmitter and one or more power receivers for wireless power charging according to the related art.

Referring to FIG. 2, resonance based inductive coupling 200 between a power transmitter 102 and more than one power receivers 106 is also known in the art. In this technique, the power transmitter 102 transmits energy radiation at a particular frequency to multiple power receivers 106 for performing charging operations. A two way communication is established between the power receivers 106 and the power transmitter 102. The charging of the power receivers 106 occurs due to resonant inductive coupling between the power transmitter 102 and the power receivers 106. This method of resonant inductive coupling is one of the near field wireless transmissions of electrical energy.

In resonant inductive coupling, the primary coil 104 of the power transmitter 102 and the secondary coil 108 of each power receiver 106 are configured to resonate at the same frequency of electromagnetic radiation. Resonance in the primary coil 104 occurs because of the presence of oscillating current generated in the power transmitter 102. Any change in oscillation or resonance in the primary coil 104 may have a direct impact on the resonance of the secondary coil 108.

Figure 3:
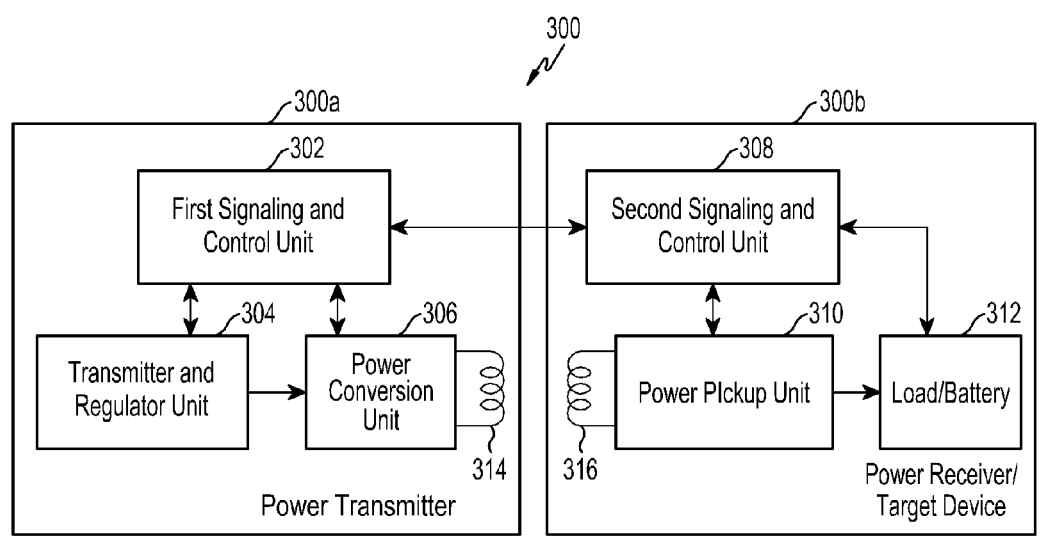
FIG. 3 illustrates a resonant inductive coupling between a power transmitter and a power receiver for wireless power charging according to an embodiment of the present disclosure.

FIG. 3 illustrates a resonant inductive coupling between a power transmitter and a power receiver for wireless power charging according to an embodiment of the present disclosure.

Referring to FIG. 3, the power transmitter 300a and the power receiver 300b are connected to each other through resonant inductive coupling. It should be noted that, though there is only one power receiver 300b illustrated in FIG. 3, there can be any number of power receivers such as 300b that are capable of being coupled to the power transmitter 300a.

In an embodiment of the present disclosure, the power transmitter 300a includes a first signal and control unit 302, a transmitter and regulator unit 304, and a power conversion unit 306. In the same embodiment, the power receiver 300b includes a second signal and control unit 308, a power pickup unit 310, and a battery 312. The first signal and control unit 302 and the second signal and control unit 308 perform a two way communication. For instance, this two way communication between the first signal and control unit 302 and the second signal and control unit 308, may be performed under the networking protocol such as Near Field Communication Interface Protocol (NFCIP).

In an embodiment of the present disclosure, the working principle of the power transmitter 300a is provided. The signal and control unit 302 is be configured to facilitate communication of the power transmitter 300a with the power receiver 300b, more specifically, by discovering the power receiver 300b. This communication provides the number of devices (e.g., power receivers including 300b) discovered within the frequency or the number of devices present in a wireless charging pad. The transmitter and regulator unit 304 may receive information regarding the number of the power receivers (including 300b) and determine a configuration of resonant radiation. Thereafter, the power conversion unit 300a which includes a primary coil 314, receives the configuration related information and transmits the power or charge through resonance induction.

In another embodiment, the working principle of the power receiver 300b is provided. The second signal and control unit 308 communicates with the first signal and control unit 302 to facilitate charging and discovering of the power receiver 300b. The radiation (caused because of resonant induction) from the power transmitter 300a is received at the power pickup unit 310. In an embodiment, the second signal and control unit 308 and the power pickup unit 310 are connected internally. The charge received through a secondary coil 304 is converted by the power pickup unit 310 and the charge is stored in battery 312.

Figure 4:
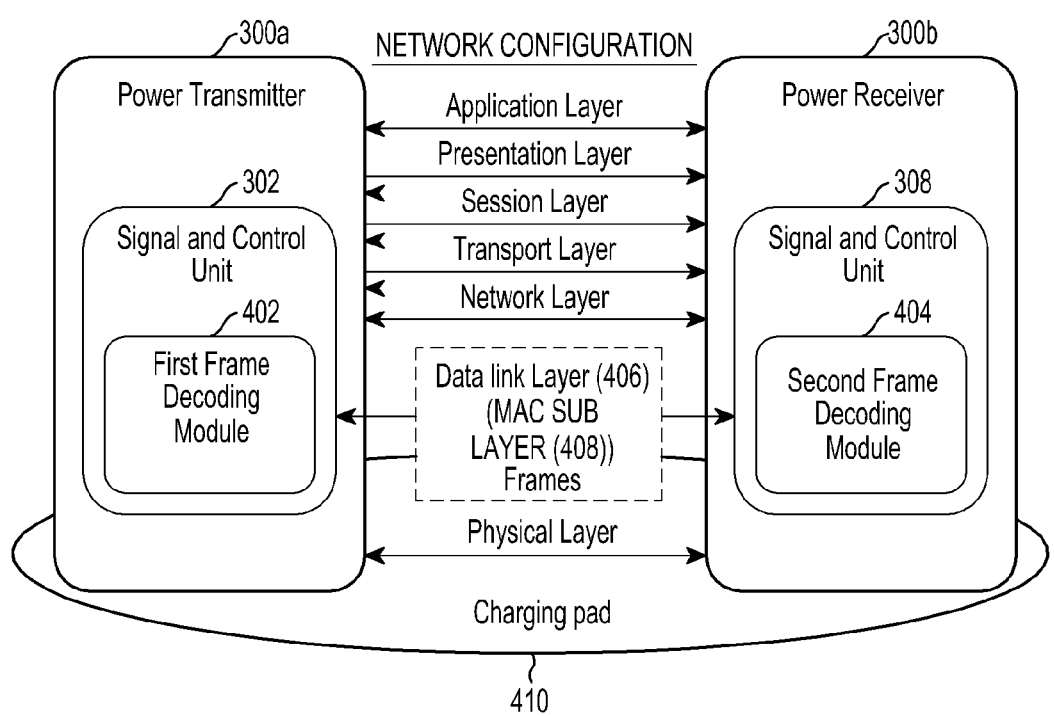
FIG. 4 is a schematic view of a communication mode between a power transmitter and a power receiver according to an embodiment of the present disclosure.

FIG. 4 is schematic view of a communication mode between a power transmitter and a power receiver according to an embodiment of the present disclosure.

Referring to FIG. 4, the power transmitter 300a and the power receiver 300b are positioned in a charging pad 410. In accordance with an embodiment of the present disclosure, the power transmitter 300a and the power receiver 300b communicate through a data link layer 406. In an embodiment, a Media Access Control (MAC) Sub Layer 408 of a network configuration is used as a network layer for communication. In another embodiment, the network communication between the power transmitter 300a and the power receiver 300b can be a MAC layer (not shown in the figure). In yet another embodiment, any layer of network communication can be utilized for communication between the power transmitter 300a and the power receiver 300b. In another embodiment, information transfer at the MAC sub layer 408 between the power transmitter 300a and the power receiver 300b occur in the form of frames (frames are a form of data packets at MAC sub layer 408). It shall be noted that frames provided in this embodiment and other various embodiments are just one embodiment of data communication and any data format can be used to facilitate communication between the power transmitter 300a and the power receiver 300b. Such changes and minor modification is known to the person skilled in the art of communications and networks.

In the current embodiment of the present disclosure, a first signal and control unit 302 includes a first frame decoding module 402. The first frame decoding module 402 is configured to decode or interpret the frame received from the power receiver 300b. The frames are interpreted to transmitter readable signals at the signal and control unit 302. Further, a second signal and control unit 308 includes a second frame decoding module 404 configured to interpret frames from the power transmitter 300a to receiver readable signals.

Figure 5A:
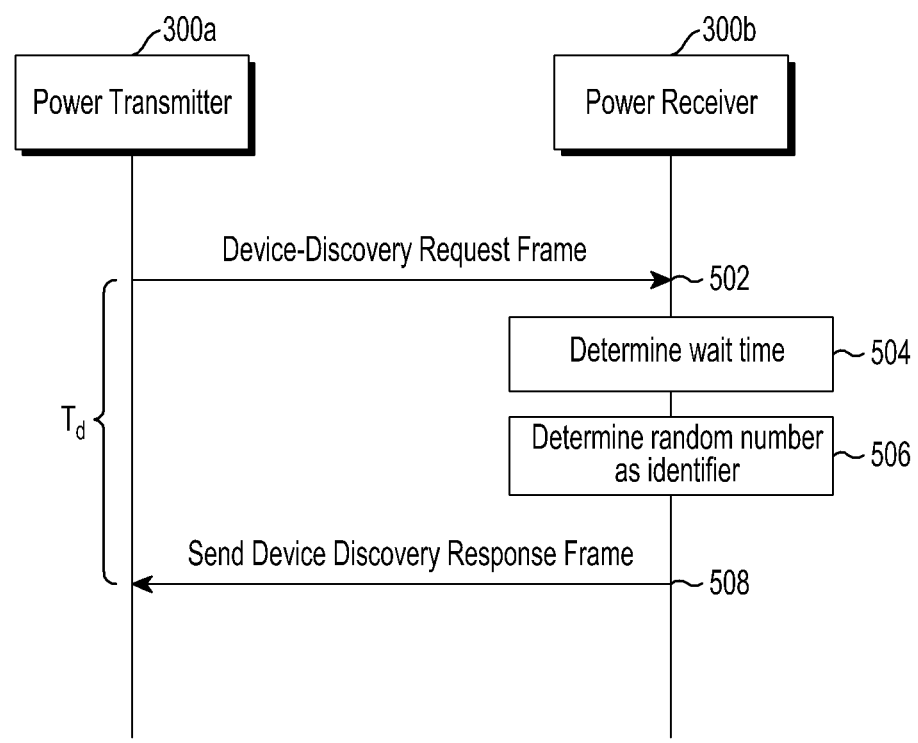
FIG. 5A illustrates a method of discovering a device for wireless power charging according to an embodiment of the present disclosure.

FIG. 5A illustrates a method of discovering a power receiver for wireless power charging according to an embodiment of the present disclosure.

Referring to FIG. 5A, a device-discovery request frame is sent by the power transmitter 300a to the power receiver 300b at operation 502. The power receiver 300b, on receiving the request frame from the transmitter 300a, determines a wait time at operation 504. In an embodiment of the present disclosure, the wait time determined by the power receiver 300b is less than a threshold response time ($T_d$). For example, the threshold response time, is assigned by the power transmitter 300a based on an asserted number of power receivers that are present on the charging pad 410 (refer to FIG. 4), history of threshold response time values (set by the transmitter 300a) and device discovery results. At operation 506, the power receiver 300b determines a random id for facilitating identification in the network of other power receivers and the power transmitter 300a. At operation 508, the power receiver 300b sends a device discovery response frame to the power transmitter 300a. The device discovery response frame includes the random id which is specific to the power receiver 300b. It shall be noted that the device discovery response frame is sent within the threshold response time ($T_d$) assigned by the power transmitter 300a.

Figure 5B:
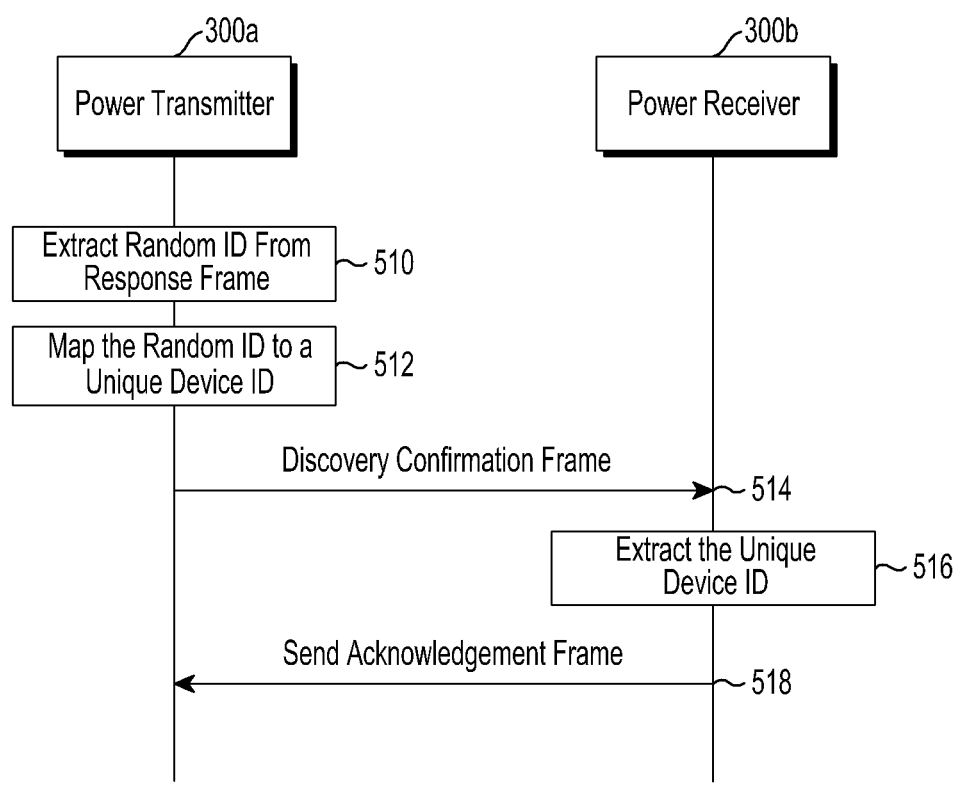
FIG. 5B illustrates a method of discovering a device for wireless power charging according to an embodiment of the present disclosure.

FIG. 5B illustrates a method of discovering a device for wireless power charging according to an embodiment of the present disclosure.

It may be perceived as the method of FIG. 5B is a continuation of the method described in FIG. 5A.

Referring to FIG. 5B, the random id provided by the power receiver 300b at operation 502 is extracted by the power transmitter 300a at operation 510. At operation 512, the random id is mapped to a device id that is unique for the power receiver 300b. At operation 514, a device discovery confirmation frame is sent to the power receiver 300b. The device discovery confirmation frame includes the random id and the unique device id. At operation 516, the power receiver 300b extracts the device id that is unique. Thereafter, the receiver 300b sends a device discovery acknowledgement frame to the power transmitter 300a at operation 518. The device discovery acknowledgement frame includes the unique device id to the power receiver 300b.

Figure 5C:
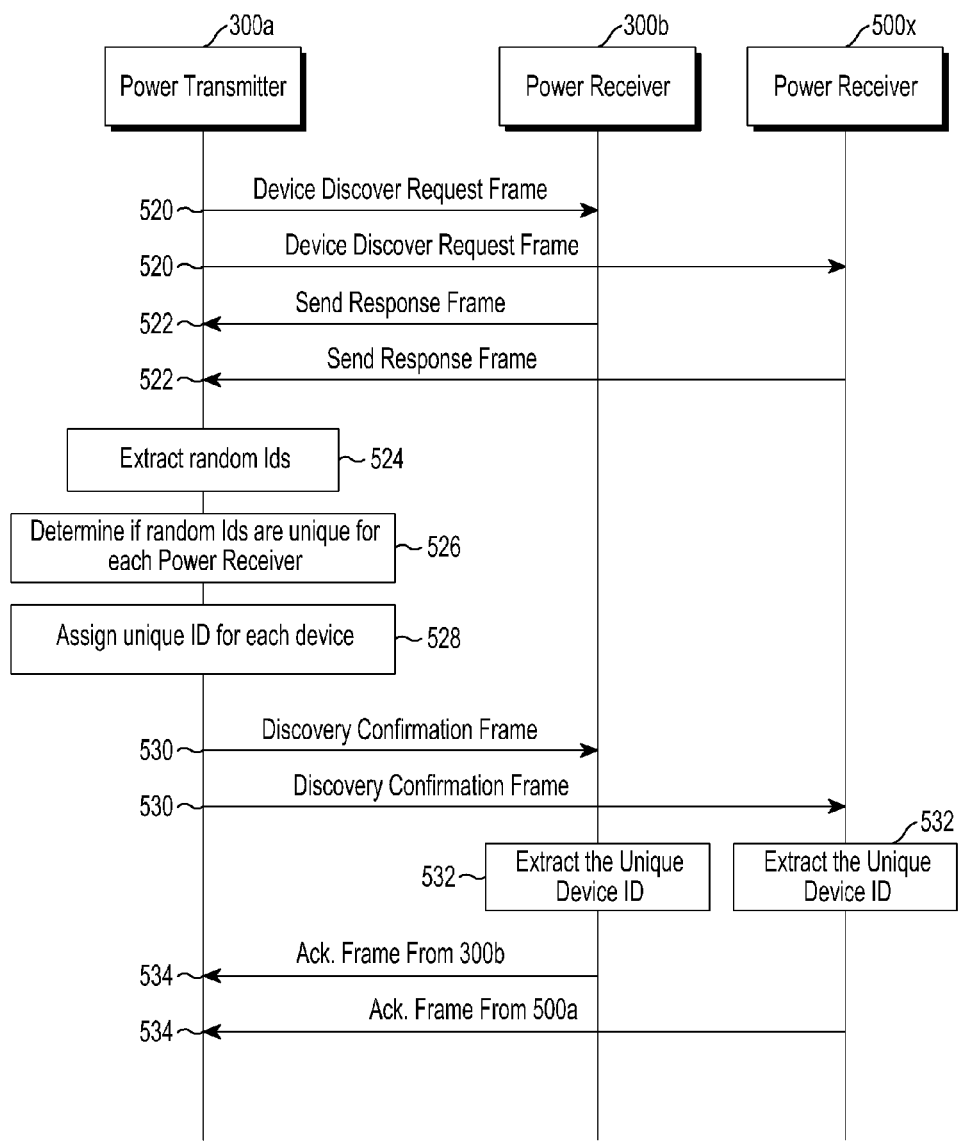
FIG. 5C illustrates a method of discovering more than one device for wireless power charging according to an embodiment of the present disclosure.

FIG. 5C illustrates a method of discovering more than one device for wireless power charging according to an embodiment of the present disclosure.

Referring to FIG. 5C, the power transmitter 300a discovers the power receivers 300b and 500x by performing one or more operations as described below.

At operation 520, the device discovery request frame is sent to two power receivers 300b and 500x. At operation 522, the power receivers 300b and 500x send a device discovery response frame to the power transmitter 300a, wherein the device discovery response frames include a random id of each of the power receivers 300b and 500x. The power transmitter 300a extracts the random ids of both power receivers 300b and 500x, at step 524. At operation 526, the power transmitter 300a determines whether the random ids are unique for each of the power receivers 300b and 500x. Thereafter, at operation 528, the random ids of the power receivers 300b and 500x are mapped to the device ids that are unique for each of the power receivers 300b and 500x. At operation 530, the power transmitter 300a sends the device discovery confirmation frame to the power receivers 300b and 500x. At operation 532, the power receivers 300b and 500x extract the unique device ids from the device discovery confirmation frame. Device discovery acknowledgement frames from the power receivers 300b and 500x are received by the power transmitter 300a at operation 534.

Figure 5D:
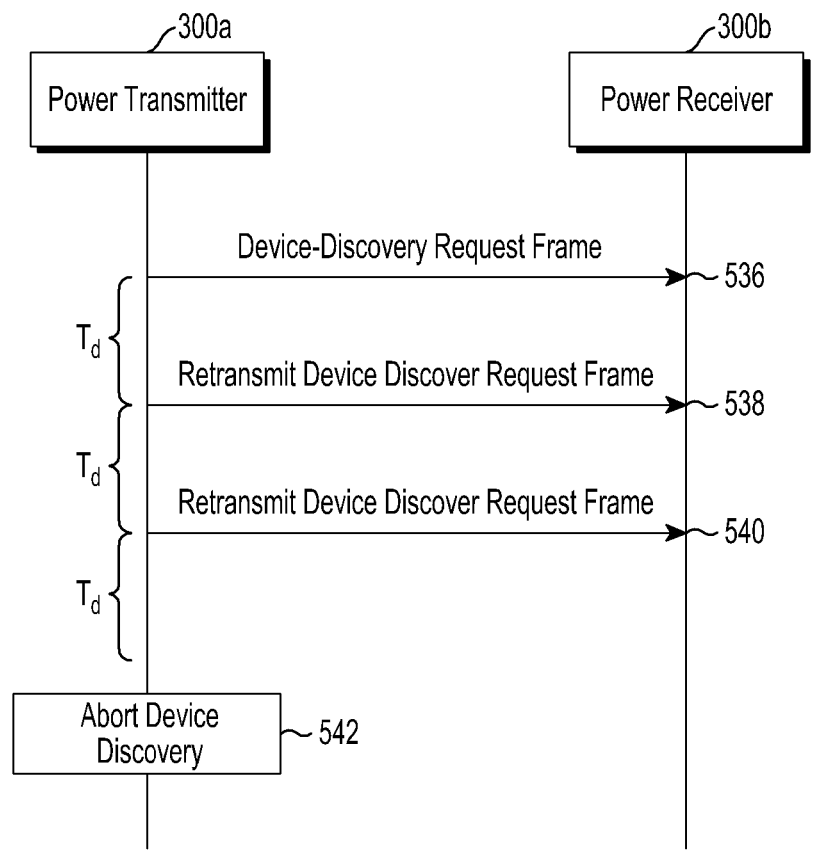
FIG. 5D illustrates a condition in a method of discovering a device for wireless power charging according to an embodiment of the present disclosure.

FIG. 5D illustrates a condition in a method of discovering a device for wireless power charging according to an embodiment of the present disclosure.

Referring to FIG. 5D, the condition can occur when the power transmitter 300a tries to communicate with a number of power receivers (including 300b). However, for illustration, a single power receiver 300b is used. It is known for the person skilled in the art to add as many power receivers possible and still follow same operations.

At operation 536, the power transmitter 300a sends the device discovery request frame to the power receiver 300b. Thereafter, the power transmitter 300a waits for a threshold response time Td. In case there was no response from the power receiver 300b, the power transmitter 300, retransmits the request at step 538. The same procedure is followed at operation 540. At operation 542, after a threshold number of times (e.g., 3), the power transmitter aborts sending the device discovery request frame to the power receiver 300b.

Figure 5E:
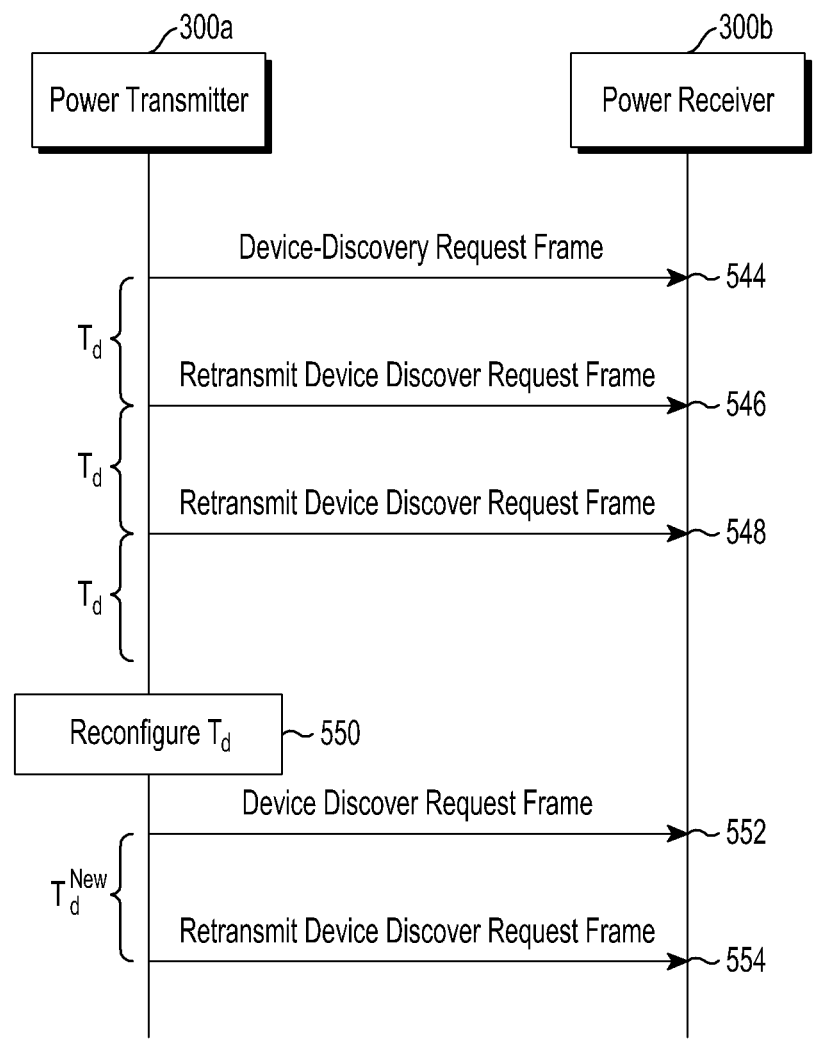
FIG. 5E illustrates a condition in a method of discovering a device for wireless power charging according to an embodiment of the present disclosure.

FIG. 5E illustrates a condition in a method of discovering a device for wireless power charging according to an embodiment of the present disclosure.

Referring to FIG. 5E, the power transmitter 300a sends the device discovery request frame to the power receiver 300b at operation 544. At operations 546 and 548, the power transmitter 300a retransmits the device discovery request frame to the power receiver 300b after waiting till the end of $T_d$. Thereafter, the power transmitter 300a reconfigures $T_d$ for the power receiver 300b, denoted by operation 550. In an embodiment of the present disclosure, the device discovery request frame is re-transmitted when no response is received from the power receiver 300b. If the device discovery response frame is received, another device discovery request frame is issued during a next discovery phase. Further, the configuration of $T_d$ applies for both the cases, i.e., for a retransmission of the device discovery request frame and for another transmission of a request frame in a new discovery phase. At operation 552, the power transmitter 300a sends the device discovery request frame with a reconfigured $T_d$, labeled as $T_d^{new}$. The procedure is repeated by retransmitting the device discovery request frame after the completion of $T_d^{new}$ at operation 554. In an embodiment of the present disclosure, the retransmission of the request frame with reconfigured $T_d$ is performed for a threshold number of times and then aborted by the power transmitter 300a.

It may be noted that the above explanation does not provide conditions for all the scenarios where the reconfiguration of $T_d$ takes place. They are only for the purpose of illustration. It may be obvious to the person skilled in the art to anticipate various combinations and conditions where the reconfiguration of $T_d$ takes place.

Figure 5F:
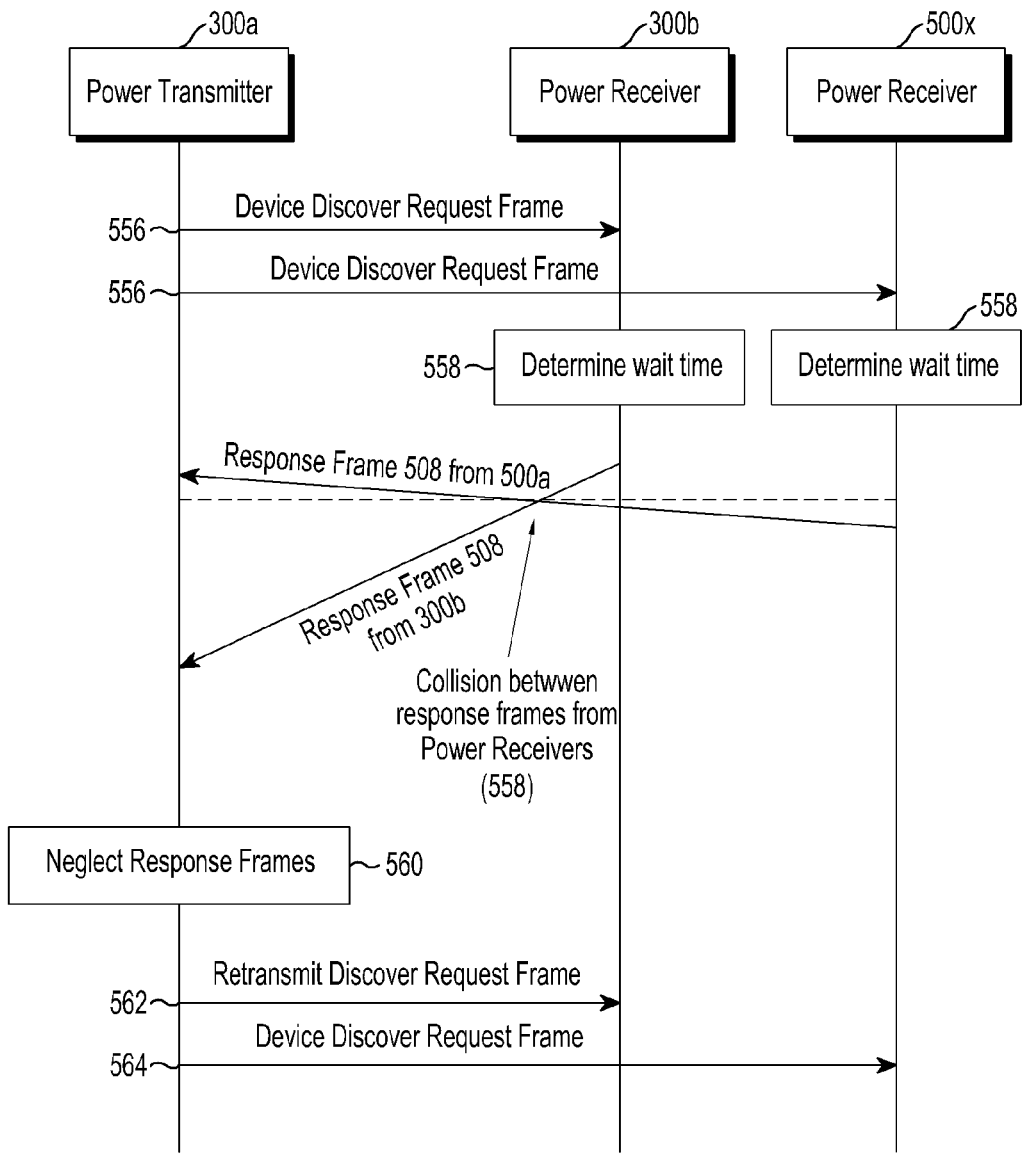
FIG. 5F illustrates a condition in a method of discovering a device for wireless power charging according to an embodiment of the present disclosure.

FIG. 5F illustrates a condition in a method of discovering a device for wireless power charging according to an embodiment of the present disclosure.

Referring to FIG. 5F, the device discovery request frame is sent by the power transmitter 300a to the power receivers 300b and 500x at operation 556. At operation 558, the power receivers 300b and 500x determine wait time to send the response frames to the power transmitter 300a. At step 558, collision between the response frames sent by the power receivers 300b and 500x occurs because both the power receivers have determined the same wait time and transmit at a same signal frequency to the power transmitter 300a. Because of the collision in the device discovery response frames, the power transmitter 300a, neglects both device discovery response frames at operation 560 and retransmits discovery request frames at operation 562 and operation 564. The new discovery request frame may or may not have same $T_d$.

Figure 5G:
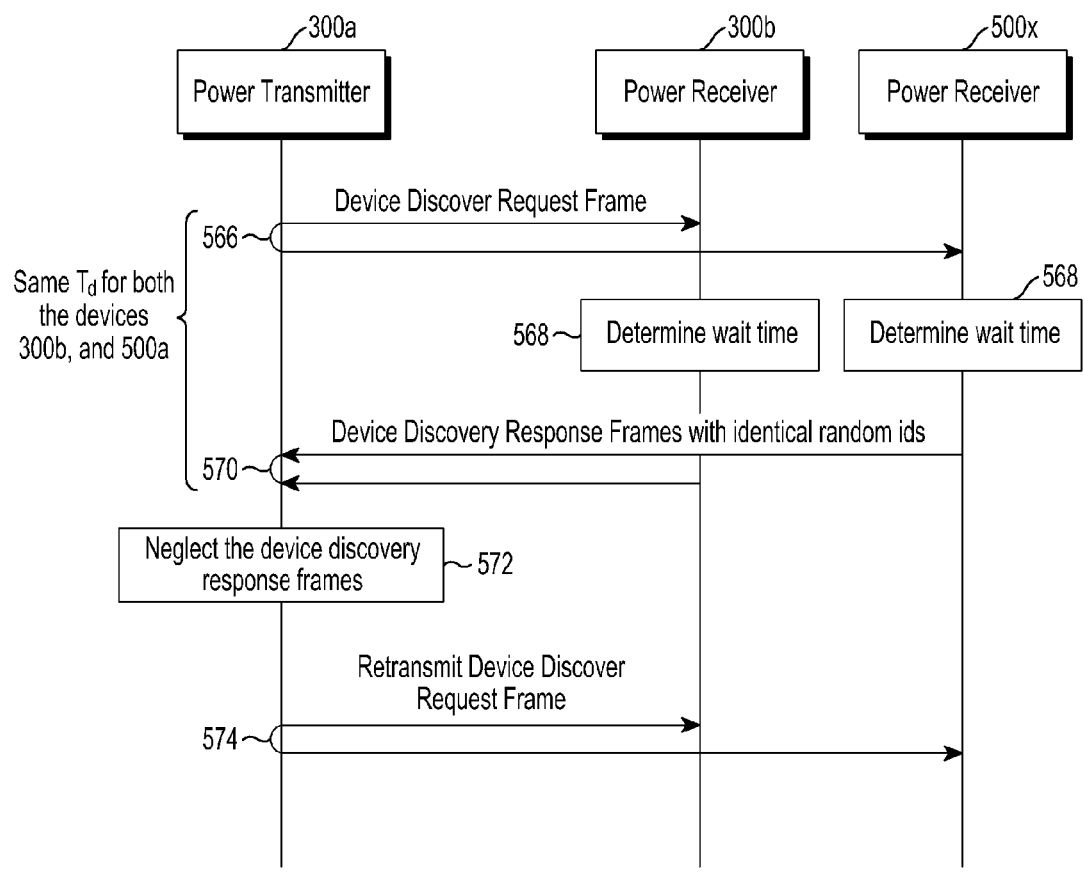
FIG. 5G illustrates a condition in a method of discovering a device for wireless power charging according to an embodiment of the present disclosure.

FIG. 5G illustrates a condition in a method of discovering a device for wireless power charging according to an embodiment of the present disclosure.

Referring to FIG. 5G, the device discovery request frames are sent by the power transmitter 300a to the power receivers 300b and 500x at operation 566. The power receivers 300b and 500x determine a waiting time at operation 568. In this embodiment, the power receivers 300b and 500x determine the same random id and transmit device discovery response frames to the power transmitter 300a at operation 570. Owing to the same random id determination, the power transmitter 300a neglects the device discovery response frames from the power receivers at operation 572. At operation 574, the power transmitter 300a retransmits device discovery request frames to the power receivers 300b and the 500x.

Figure 6:
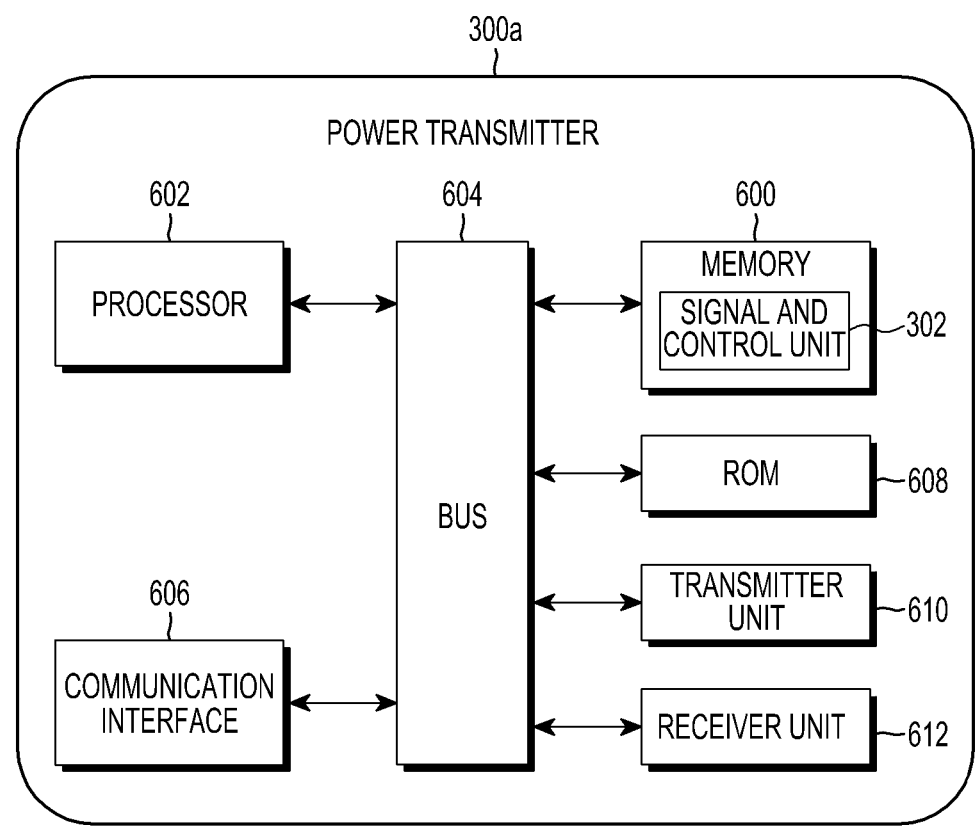
FIG. 6 is a block diagram illustrating a system configuration of a power transmitter according to an embodiment of the present disclosure.

FIG. 6 is a block diagram illustrating a system configuration of a power transmitter according to an embodiment of the present disclosure.

Referring to FIG. 6, the power transmitter 300a includes a memory 600, a processor 602, a Read Only Memory (ROM) 608, a transmitter unit 610, a bus 604, a communication interface 606, and a receiver unit 612.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

In an embodiment of the present disclosure, the memory 600 includes the first signal and control unit 302 capable of performing all the steps performed in FIGS. 5A to 5G by the power transmitter 300a. The memory 600 may be a volatile memory and a non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Various embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602.

Figure 7:
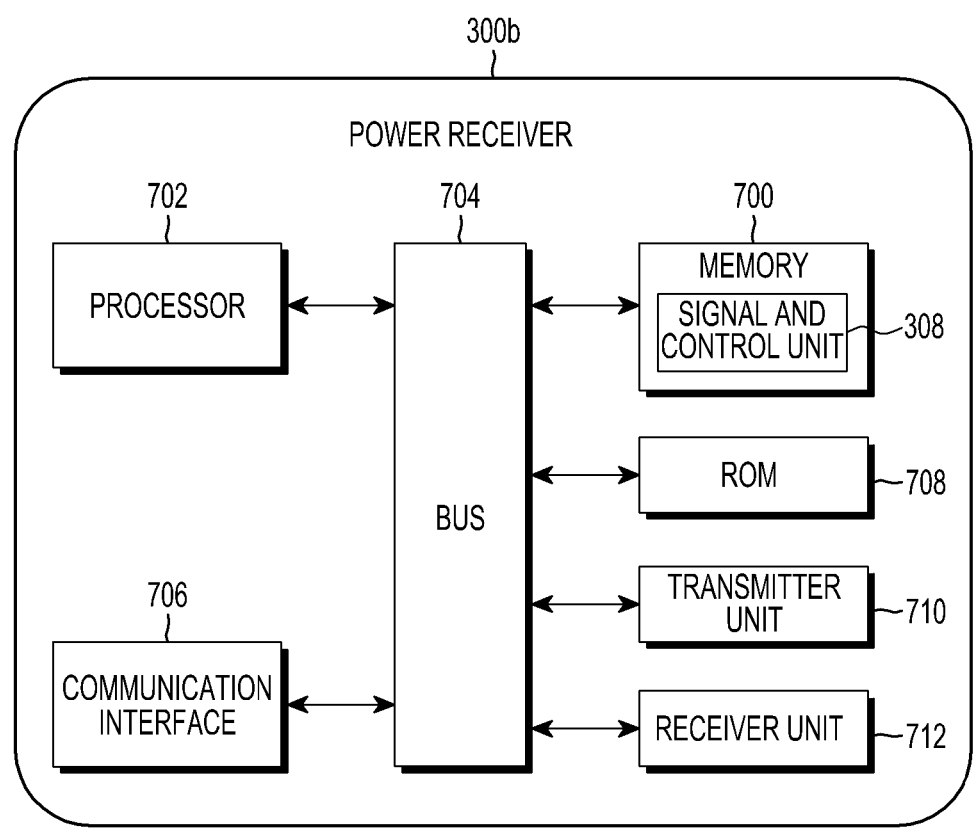
FIG. 7 is a block diagram illustrating a system configuration of a power receiver according to an embodiment of the present disclosure.

FIG. 7 is a block diagram illustrating a system configuration of a power receiver or a power receiver according to another embodiment of the present disclosure.

Referring to FIG. 7, the power receiver 300b includes a memory 700, a processor 702, a bus 704, a communication interface 706, a ROM 708, a transmitter unit 710, and a receiver unit 712.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

In an embodiment of the present disclosure, the memory 700 includes the second signal and control unit 308 capable of performing all the steps performed in FIGS. 5A to 5G by the power receiver 300b (also power receiver 500x). The memory 700 may be a volatile memory and a non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 702.

The various embodiments have been described with reference to specific embodiments. However, it will be evident that various modifications and changes may be made to these various embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for charging at least one device by a power transmitter in a wireless charging environment, the method comprising:
   broadcasting a discovery request;
   determining whether a discovery response is received in response to the discovery request from at least one device within a wait time;
   retransmitting the discovery request if the discovery response is not received from the at least one device within the wait time;
   transmitting, to the at least one device transmitting the discovery response, confirmation information if the discovery response is received from the at least one device within the wait time; and
   transmitting electromagnetic radiation to charge the at least one device if the discovery response is received from the at least one device within the wait time and an acknowledgment is received from the at least one device in response to the confirmation information,
   wherein the wait time is configured to be less than a threshold response time, and
   wherein the retransmitting of the discovery request is stopped after a predetermined number of times.

2. The method as recited in claim 1,
   wherein if discovery responses comprising an identical random identifier (ID) are received from at least two devices, the discovery request is retransmitted.

3. The method as recited in claim 1,
   wherein the threshold response time is assigned to receive the discovery response from the at least one device based on at least one of a charging pad, a history of threshold response time values, and device discovery results.

4. The method as recited in claim 1, further comprising:
   extracting a random identifier (ID) from the discovery response; and
   assigning a unique device ID to each of the at least one device by performing a one-to-one mapping of the extracted random ID with the unique device ID.

5. The method as recited in claim 1, wherein the threshold response time assigned to the at least one device is reconfigured based on a history of threshold response time values.

6. A power transmitter for charging at least one device in a wireless charging environment, the power transmitter comprising:
   a transceiver configured to broadcast a discovery request; and
   a control unit configured to:
      determine whether a discovery response is received from at least one device in response to the discovery request within a wait time,
      control the transceiver to retransmit the discovery request if the discovery response is not received from the at least one device within the wait time,
      control the transceiver to transmit, to the at least one device transmitting the discovery response, confirmation information if the discovery response is received from the at least one device within the wait time, and
      control the transceiver to transmit electromagnetic radiation to charge the at least one device if the discovery response is received from the at least one device within the wait time and an acknowledgment is received from the at least one device in response to the confirmation information,
      wherein the wait time is configured to be less than a threshold response time, and
      wherein the retransmitting of the discovery request is stopped after a predetermined number of times.

7. The power transmitter as recited in claim 6,
   wherein if discovery responses including an identical random identifier (ID) are received from at least two devices, the transceiver is further configured to retransmit the discovery request.

8. The power transmitter as recited in claim 6, wherein the threshold response time is assigned to receive the discovery response from the at least one device based on at least one of a charging pad, a history of threshold response time values, and device discovery results.

9. The power transmitter as recited in claim 6, wherein the control unit is further configured to:
   extract a random identifier (ID) from the discovery response, and
   assign a unique device ID to each of the at least one device by performing a one-to-one mapping of the extracted random ID with the unique device ID.

10. The power transmitter as recited in claim 6, wherein the threshold response time assigned to the at least one device is reconfigured based on a history of threshold response time values.

* * * * *